(12) United States Patent
Suzuki

(10) Patent No.: US 6,240,524 B1
(45) Date of Patent: May 29, 2001

(54) SEMICONDUCTOR INTEGRATED CIRCUIT

(75) Inventor: Kazumasa Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/093,382

(22) Filed: Jun. 8, 1998

(30) Foreign Application Priority Data

Jun. 6, 1997 (JP) .................................................. 9-149226

(51) Int. Cl.[7] .................................................. G06F 1/04
(52) U.S. Cl. .......................... 713/500; 713/400; 713/600
(58) Field of Search .................................. 713/500, 503, 713/400, 401, 501, 502, 650, 601, 600; 395/250; 364/716; 377/54; 327/202; 326/93

(56) References Cited

U.S. PATENT DOCUMENTS

| | | | | |
|---|---|---|---|---|
| 5,396,460 | * | 3/1995 | Harada et al. ................. | 365/189.01 |
| 5,457,644 | * | 10/1995 | McCollum ........................ | 364/716 |
| 5,564,022 | * | 10/1996 | Debnath et al. ................ | 395/250 |
| 5,600,824 | * | 2/1997 | Williams et al. ................ | 713/400 |
| 5,628,000 | * | 5/1997 | Kashiyama et al. ............. | 713/503 |
| 5,742,798 | * | 4/1998 | Goldrian ........................... | 713/400 |
| 5,764,965 | * | 6/1998 | Poimboeuf et al. ............. | 713/400 |
| 5,774,003 | * | 6/1998 | Qureshi et al. .................. | 327/202 |
| 5,774,371 | * | 6/1998 | Kawakami ....................... | 364/491 |
| 5,790,841 | * | 8/1998 | Scherer et al. .................. | 713/503 |
| 5,828,870 | * | 10/1998 | Gunadisastra .................. | 713/503 |
| 5,867,691 | * | 2/1999 | Shiraishi ........................... | 713/400 |
| 5,883,529 | * | 3/1999 | Kumata et al. ................... | 326/93 |
| 5,926,519 | * | 7/1999 | Yoshikawa et al. ............. | 377/54 |
| 5,955,904 | * | 9/1999 | Idei et al. ......................... | 327/160 |
| 5,969,551 | * | 10/1999 | Fujioka ............................. | 327/149 |
| 5,982,827 | * | 11/1999 | Duffner et al. .................. | 375/354 |

FOREIGN PATENT DOCUMENTS

| | | | | |
|---|---|---|---|---|
| 4-140812 | 5/1992 | (JP) | ................................. | G06F/1/12 |
| 5-53681 | 3/1993 | (JP) | ................................. | G06F/1/06 |
| 5-113834 | 5/1993 | (JP) | ................................. | G06F/1/08 |
| 5-289770 | 11/1993 | (JP) | ................................. | G06F/1/12 |
| 8-55084 | 2/1996 | (JP) | ................................. | G06F/13/42 |
| 8-223247 | 8/1996 | (JP) | ................................. | H04L/29/08 |

* cited by examiner

*Primary Examiner*—Thomas Lee
*Assistant Examiner*—Rijue Mai
(74) *Attorney, Agent, or Firm*—Hayes, Soloway, Hennessey, Grossman & Hage, P.C.

(57) ABSTRACT

The whole of a semiconductor integrated circuit operating in synchronism with a clock signal, is divided into a plurality of circuit blocks in units of a function, and different clock signals are supplied to the circuit blocks, respectively. Each of the circuit blocks is so constructed as to minimize the clock skew, by taking into consideration the size of clock buffers and the balance in load of the clock buffers. A data signal between two circuit blocks of the circuit blocks is transferred through a queue which is controlled to fetch the data in response to the clock signal supplied to the circuit block at the input side of the queue and to output the fetched data in response to the clock signal supplied to the circuit block at the output side of the queue.

15 Claims, 12 Drawing Sheets

SEMICONDUCTOR INTEGRATED CIRCUIT

BACKGROUND OF THE INVENTION

1. Field of the Invention

The present invention relates to a semiconductor integrated circuit, and more specifically to a semiconductor integrated circuit operating in synchronism with a clock signal.

2. Description of Related Art

Referring to FIG. 12, there is shown a block diagram illustrating one example of a prior art semiconductor integrated circuit.

In the prior art, this type of semiconductor integrated circuit was so configured that the whole of the semiconductor integrated circuit is caused to operate in synchronism with one clock signal in order to surely execute an arithmetic and logic operation and transmission of signals. In addition, this type of semiconductor integrated circuit is generally divided into circuit blocks in units of function, and data signals and control signals are transferred between the circuit blocks. Here, for simplification of consideration, it is assumed that the shown semiconductor integrated circuit is composed of three circuit blocks, namely, a circuit block A, 10, a circuit block B, 20 and a circuit block C, 30. However, even if the semiconductor integrated circuit is composed of more than three circuit blocks, what will be discussed below will hold similarly. Namely, the same clock signal 1 is supplied to all the circuit blocks. The circuit block A, 10 fetches a data signal 150 supplied from an external device and data signals 110 and 310 supplied from the other blocks, and executes a processing for each clock period to output a data signal 110 to another block. Similarly, for each clock period, each of the circuit block B, 20 and the circuit block C, 30 fetches data, executes a processing and output data to another block. In each of the circuit blocks, the clock signal having the same frequency, generated in one common signal source, is received, an intermediate data is held in a register circuit or a flipflop circuit, which is one constituent included in the circuit block, and then, a signal processing is executed for the intermediate data, and the result of the processing is written into the register circuit or the flipflop circuit in response to a next signal. Although the control signals are not shown in FIG. 12, by considering that the control block is one circuit block, the control signals are supplied to the other circuit block in the form similar to that of the data signals. Alternatively, each circuit block can include a control circuit. In this case, the control signal is supplied in parallel to the data signal.

In this circuit construction, it is necessary to reduce a clock skew, namely, to supply the clock signal to the register circuits and the flipflop circuits in all the circuits with the same delay time and to make the changing timing of the clock signals supplied to these circuits consistent to each other. Japanese Patent Application Pre-examination Publication No. JP-A-08-030655, (an English abstract of JP-A-08-030655 is available from the Japanese Patent office and the content of the English abstract of JP-A-08-030655 is also incorporated by reference in its entirety into this application) discloses a designing method for reducing the clock skew.

In addition, S. KOZU et al "A 100 Mkz, 0.4 W RISC Processor with 200 MHz Multiply-Adder, using Pulse-Register Technique", 1996 IEEE International Solid-State Circuits Conference, Digest of Slide-Supplement, Session FA 8.6, pp 106–107, February, 1996, reports an example in which a deviation is intentionally introduced in the clock signal, so that the clock period is caused to be quasi-elongated only in some circuit, and therefore, a processing time longer than that for the other circuits is allocated. Clock signals are derived from one signal. For example, a circuit operating with a deviated clock signal has a modified number of clock buffers, so that, at a designing stage a delay time from a main stream clock signal is deviated from the other circuit portions.

However, the following problems have been encountered.

A first problem is that it is difficult to distribute the clock signal to the whole of the semiconductor integrated circuit with the same delay time.

The reason for this is as follows: The circuit scale of the semiconductor integrated circuit has an inclination of increasing more and more, and therefore, the number of flipflops requiring the clock signal correspondingly increases, with the result that it has become difficult to design the circuit so as to reduce the skew of the clocks supplied to respective flipflops. In addition, since the size of circuit elements included in the semiconductor integrated circuit becomes small, the influence of variation in the manufacturing process is large, and therefore, even if the distribution delay of the clock signal is equalized at the designing stage, since the delay time is different from one circuit element to another in an actual circuit, the clock skew occurs. Alternatively, in the case that the derived is intentionally deviated in the clock signal, it is necessary to determine the amount of deviation at the designing stage, and there is no other than to control the delay time from the clock signal source to the respective flipflop.

A second problem is that the clock skew greatly lowers the performance of the integrated circuit.

The reason for this is as follows: In order to elevate the performance of the integrated circuit, it is necessary to shorten the clock period so that many processing must be executed for a shortened time. However, if there is a clock skew, the processing cannot be executed for the time of the clock skew in order to avoid error in the signal transfer, and therefore, the clock period must be made long.

A third problem is that the power consumption is large.

The reason for this is as follows. If the clock frequency is made high in order to elevate the performance of the integrated circuit, the power consumption correspondingly becomes large. If the clock frequency is determined for the whole of the integrated circuit, even if a the amount of processing is small, the circuit must be operated at the same clock frequency.

SUMMARY OF THE INVENTION

Accordingly, it is an object of the present invention to provide a semiconductor integrated circuit, which has overcome the above mentioned defects of the conventional one.

Another object of the present invention is to provide a semiconductor integrated circuit capable of ensuring the operation even if the semiconductor integrated circuit becomes large in scale so that the skew of the clock distributed to the whole of the chip becomes large.

Still another object of the present invention is to provide a semiconductor integrated circuit capable of reducing the electric power consumed by the clock signal distributed to the whole of the integrated circuit and the power consumption of the circuits operating with the clock signal.

The above and other objects of the present invention are achieved in accordance with the present invention by a semiconductor integrated circuit operating in synchronism with a clock signal, the whole of the semiconductor integrated circuit being divided into a plurality of circuit blocks in units of a function, the semiconductor integrated circuit being so configured that different clock signals are supplied to the circuit blocks, respectively, each of the circuit blocks being so constructed by taking into consideration the size of clock buffers and the balance in load of the clock buffers in order to minimize the clock skew, and a data signal between two circuit blocks of the circuit blocks being transferred through a queue which is controlled by the clock signal supplied to the two circuit blocks.

The clock signals supplied to the respective circuit blocks can be generated in one common clock signal source, but supplied through respective independent paths. Alternatively, the clock signals supplied to the respective circuit blocks can be generated in different PLL (phase locked loop) circuits, respectively.

In addition, the clock signals supplied to the respective circuit blocks can be different from one another in frequency. In this connection, the clock signals having the different frequencies, supplied to the respective circuit blocks can be generated in different PLL circuits, respectively. Preferably, the frequency of the clock signal generated in each PLL circuit is controlled on the basis of the data processing amount in the circuit block operating with the clock signal supplied from the same PLL circuit.

In a preferred embodiment, the queue includes a data buffer fetching data in response to a first clock signal and outputting the data in response to a second clock signal, and a plurality of buffers or a FIFO (first-in first-out) buffer operating to hold an output of the data buffer in response to the second clock signal.

More specifically, the queue is preferably constituted of any one or all of an instruction queue, a reservation station, a reorder buffer, and an address queue of in a superscalar processor. The clock frequency may be different before and after the queue included in the superscalar processor, or alternatively, the clock frequency can be modified in accordance with the data processing amount in different constituents of the superscalar processor, such as an arithmetic and logic unit and a cache memory.

With the above mentioned arrangement, the queue connected to each of the circuit blocks receives the corresponding clock signal so that the queue fetches the data in synchronism with the clock signal supplied to the circuit block at the input side of the queue, and the queue outputs the data in synchronism with the clock signal supplied to the circuit block at the output side of the queue. Thus, data can be transferred between the circuit blocks which operate with different clocks, respectively. Accordingly, the circuit can operate even if there is a clock skew and/or a clock frequency difference between the circuit blocks. Furthermore, since each circuit block is smaller than the whole of the integrated circuit as a matter of course, it is possible to distribute the clock in the circuit block with a minimized clock skew. In addition, since there may be a clock frequency difference between the circuit blocks, it is possible to set the clock frequency of the circuit block having only a small processing amount at a low value, with the result that the power consumption can be reduced.

The above and other objects, features and advantages of the present invention will be apparent from the following description of preferred embodiments of the invention with reference to the accompanying drawings.

DESCRIPTION OF THE PREFERRED EMBODIMENTS

Now, the semiconductor integrated circuit in accordance with the present invention will be described with reference to FIG. 1.

Figure 1:
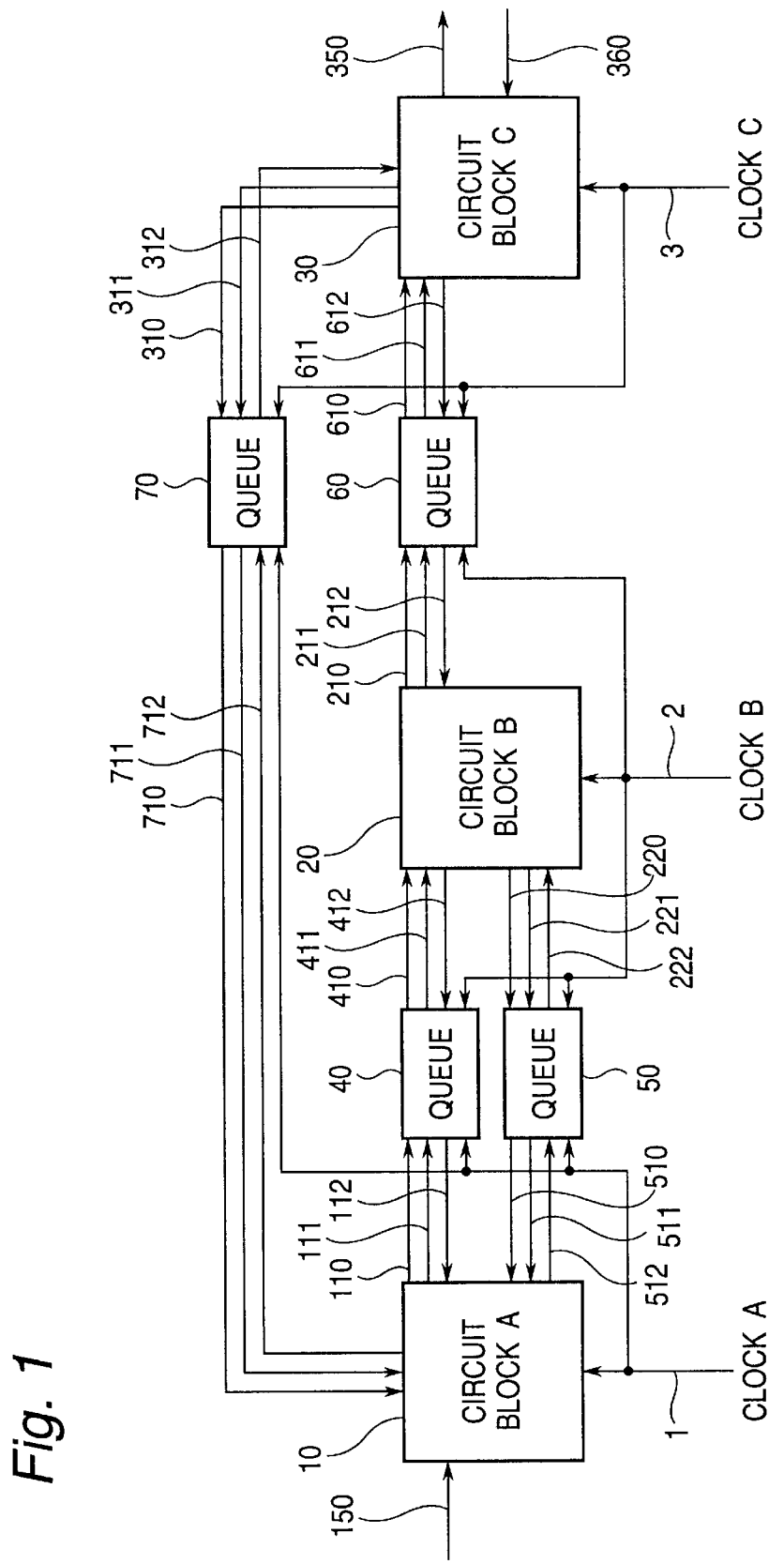
FIG. 1 is a block diagram of a first embodiment of the semiconductor integrated circuit in accordance with the present invention.

Referring to FIG. 1, there is shown a block diagram of a first embodiment of the semiconductor integrated circuit in accordance with the present invention.

In the embodiment shown in FIG. 1, the whole of the semiconductor integrated circuit is divided into three circuit blocks, namely, a circuit block A, 10, a circuit block B, 20, and a circuit block C, 30. The circuit block A receives a signal 150 from an external device (not shown), a data signal 220 from the circuit block B, and a data signal 310 from the circuit block C, and outputs a data signal 110 which is the result of the processing, to the circuit block B. However, the data signal 220 from the circuit block B is supplied through a first queue 50 as a data signal 510 to the circuit block A. In order to transfer data between the first queue 50 and the respective circuit blocks, a request signal 511 and a busy signal 512 are transferred between the first queue 50 and the circuit block A, and a request signal 211 and a busy signal 212 are transferred between the first queue 50 and the circuit block B.

Similarly, a second queue 70 is provided between the circuit block C and the circuit block A. The data signal 310 from the circuit block C is supplied through the second queue 70 as a data signal 710 to the circuit block A. Also similarly, a request signal 711 and a busy signal 712 are transferred between the second queue 70 and the circuit block A, and a request signal 311 and a busy signal 312 are transferred between the second queue 70 and the circuit block C.

Furthermore, in order to transfer the data signal from the circuit block A to the circuit block B, a third queue 40 is provided between the circuit block A and the circuit block B, so that the data signal 110 from the circuit block A is supplied through the third queue 40 as a data signal 410 to the circuit block B. For this purpose, a request signal 111 and a busy signal 112 are transferred between the circuit block A and the third queue 40, and a request signal 411 and a busy signal 412 are transferred between the third queue 40 and the circuit block B. Similarly, signals are transferred between the circuit block B and the circuit block C through a fourth queue 60.

Although control signals are not shown in FIG. 1 for simplification of the drawing, a control circuit is included in a circuit block to be controlled by the control circuit, and a control signal in a close relation to a data signal to be supplied to another circuit block is supplied together with and in parallel to the data signal through the queue to the another circuit block.

The circuit block A operates in synchronism with a clock signal A, 1, and the circuit block B operates in synchronism with a clock signal B, 2. In addition, the circuit block C operates in synchronism with a clock signal C, 3. Limiting to each circuit block, since each circuit block is smaller in size than the whole of the integrated circuit, it is possible to minimize the clock skew. It is possible to supply each of the circuit blocks with the clock signal of the same frequency having a skew, or alternatively with a clock signal having a different frequency. Each of the first queue 50 and the second queue 70 provided between the circuit block A and the circuit block B is supplied with the two clocks of the clock signal A and the clock signal B. The first queue 50 fetches the data in response to the clock signal A, and outputs the data in response to the clock signal B. The second queue 70 fetches the data in response to the clock signal B, and outputs the data in response to the clock signal A. By interposing the queue, data is transferred between the circuit blocks operating with the different clocks, respectively.

The clock A, 1 is supplied to the circuit block A, the first queue 50, the second queue 70 and the third queue 40. Specifically, the clock A is finally supplied to flipflop circuits and latch circuits included in the four circuits. Therefore, the clock skew must be minimized for all these flipflop circuits and latch circuits. For this purpose, an original clock signal is supplied to a plurality of first stage clock buffers, each of which is connected to the same number of second stage clock buffers through wiring conductors connecting to the same number of second stage clock buffers, in order to equalize a load of the respective first stage clock buffers. At this time, since the wiring conductor becomes a load, the length of the wiring conductor connected to an output of each first stage clock buffer is equalized. Furthermore, an output of each second stage clock buffer is connected to the same number of third stage clock buffers and a wiring conductor having the same length, in order to equalize a load of each second stage of clock buffer. By repeating this connection manner, the number of clock buffers is increased until the clock signal is supplied to all the flipflop circuits and latch circuits through the same number of clock buffers. Thus, the clock skew can be minimized by using the clock buffers in the above mentioned manner. This is also applied to the clock B, 2 and the clock C, 3.

Figure 2:
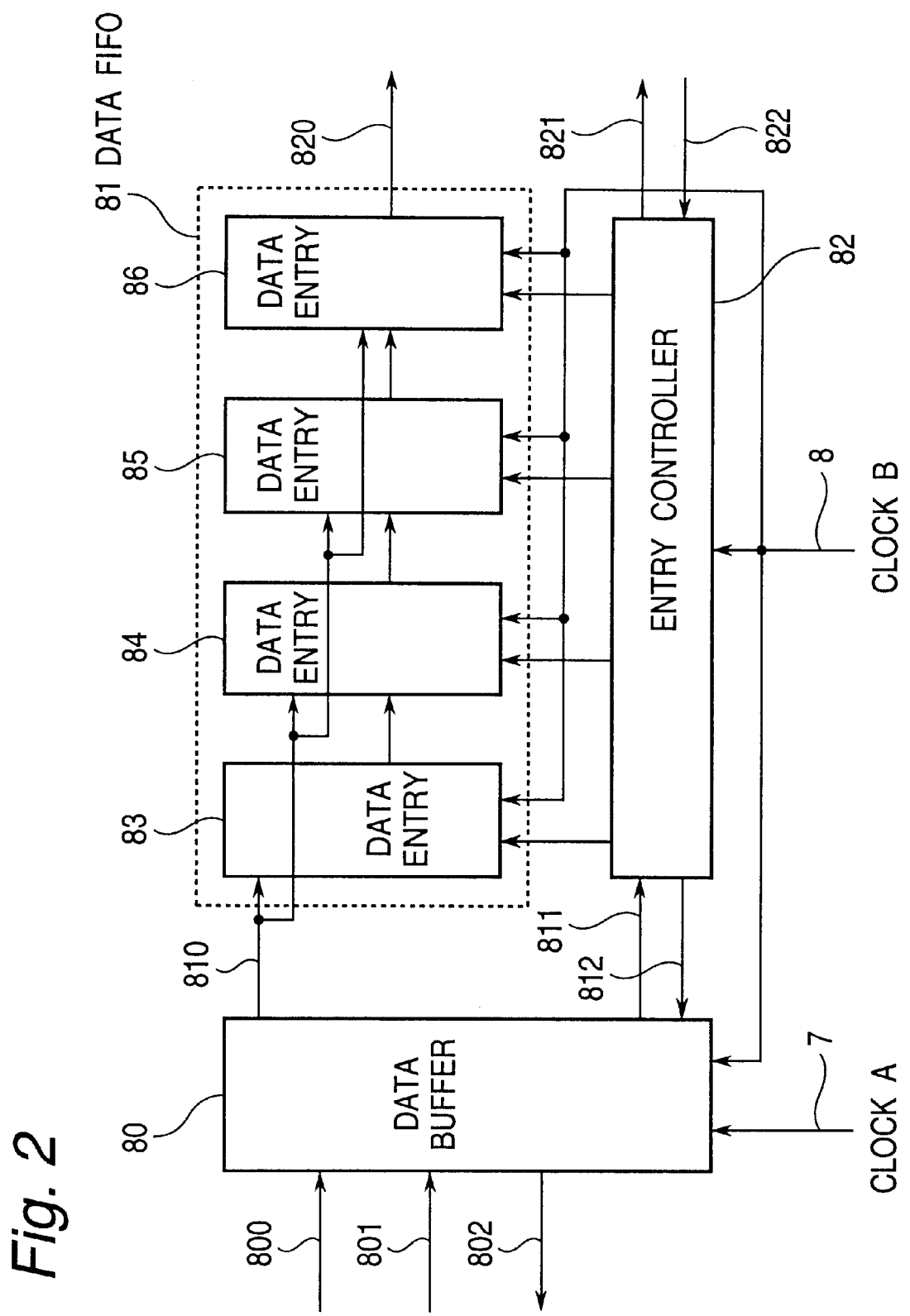
FIG. 2 is a block diagram of an example of the queue incorporated in the embodiment shown in FIG. 1.

Referring to FIG. 2, there is shown a block diagram of the first to fourth queues 50, 70, 40 and 60 included in the first embodiment. The queue includes a data buffer 80 for holding an inputted data, a data FIFO 81 for holding a plurality of items of data, and an entry controller 82 for controlling the FIFO 81. In the shown example, the FIFO 81 comprises four data entries 83 to 86, each for holding the data. Data is inputted through an data input 800 to the data buffer 80 and held in the data buffer 80. At this time, a hand shaking is carried out by using a request signal 801 and a busy signal 802. If the data is held in the data buffer, the data is transferred to an empty data entry in the data FIFO.

The data buffer 80 is supplied with two different clocks, namely, a first clock signal A, 7 and a second clock signal B, 8, and fetches the data in synchronism with the first clock 7 and outputs the data in synchronism with the second clock 8. The data entries 83 to 86 are controlled by the entry controller 82, so that which of the data entries 83 to 86 should hold the data outputted from the data buffer 80 is determined by the entry controller 82. The entry controller discriminates whether or not there is empty data entry, and notifies to the result of the discrimination to the data buffer 80. Also in this case, a hand shaking is carried out by using a request signal 811 and a busy signal 812.

If the data is held in the data entry, the data is outputted from a data output 820. When this data output is transferred to a next circuit block, the entry having held the data is released by the entry controller. If the data is released from the data entry corresponding to the bottom of the FIFO, data is shifted to fill up the data entry corresponding to the bottom of the FIFO. A hand shaking between the queue and the circuit block connected to the output side of the queue is controlled by a request signal 821 and a busy signal 822. The data entries and the entry controller operate in synchronism with the second clock B, 8.

Here, the data input signal 800 corresponds to the data signals 110, 210, 220 and 310 in the embodiment shown in FIG. 1, and the data output signal 820 corresponds the data signals 410, 610, 710 and 510 in the embodiment shown in FIG. 1.

Figure 3:
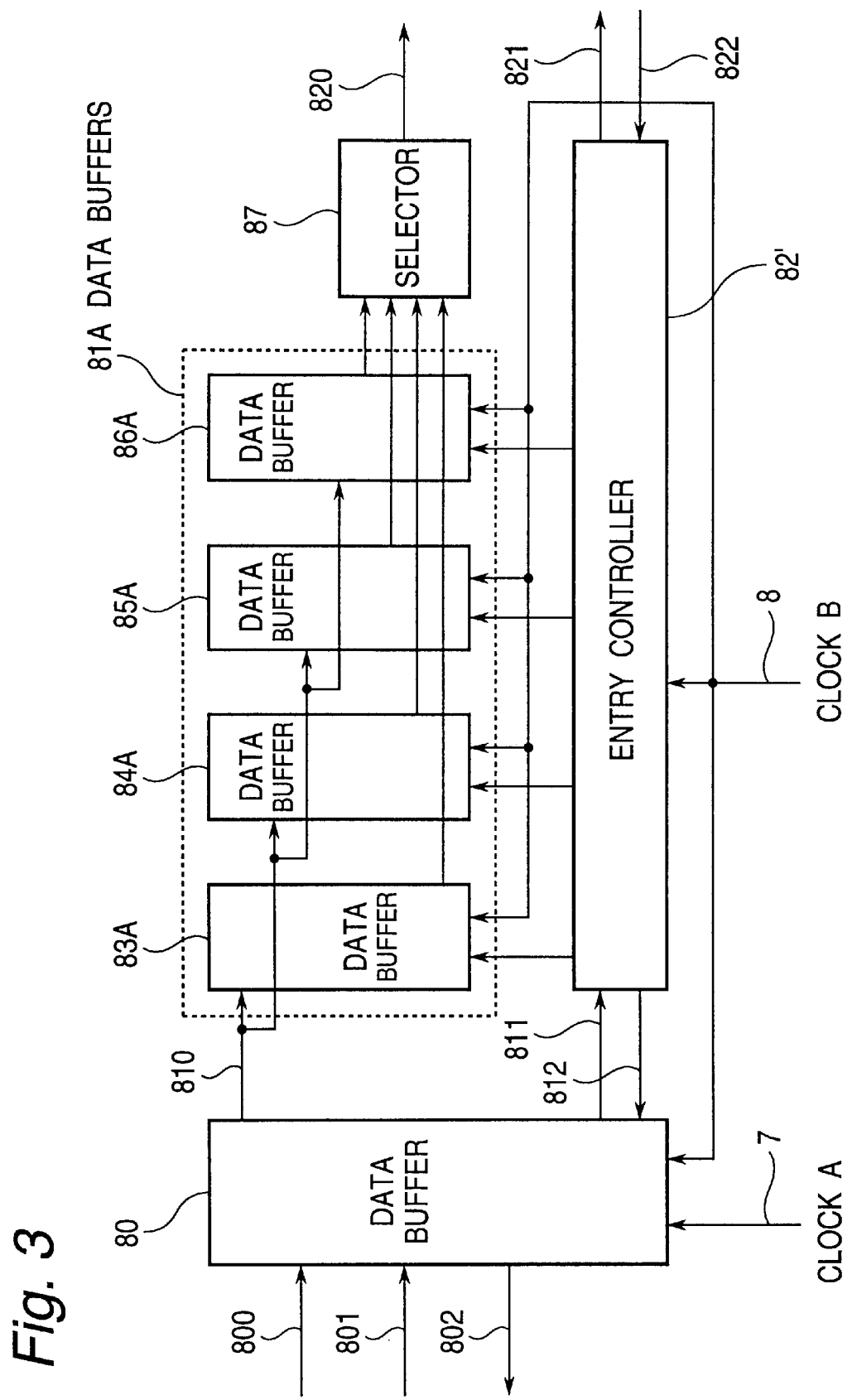
FIG. 3 is a block diagram of another example of the queue incorporated in the embodiment shown in FIG. 1, which includes a selector connected to each data buffer.

Referring to FIG. 3, there is shown a block diagram of a modification of the queue in which the FIFO 81 shown in FIG. 2 is replaced with a data buffer group 81A composed of four data buffers 83A, 84A, 85A and 86A and so configured to output the data from each data entry, and a selector 87 is added for selecting one from the outputs of the data entries. In FIG. 3, elements similar to those shown in FIG. 2 are given the same Reference Numerals, and explanation thereof will be omitted for simplification of the description.

With this modification, by changing the outputting order of the data buffers 83A, 84A, 85A and 86A registered with the data from the data buffer 80, the data can be supplied to the circuit block at the output side of the queue. It is possible to use the queue shown in FIG. 3 as the queues shown in FIG. 1.

Now, an operation of the queue will be described with reference FIGS. 4 to 6. Here for simplification of the description, it is assumed that the number of data entries is 2, not 4 as in the embodiment shown in FIGS. 1 to 3. However, it would be apparent to persons skilled in the art that generality of the queue is not lost even if the number of entries is different.

Figure 4:
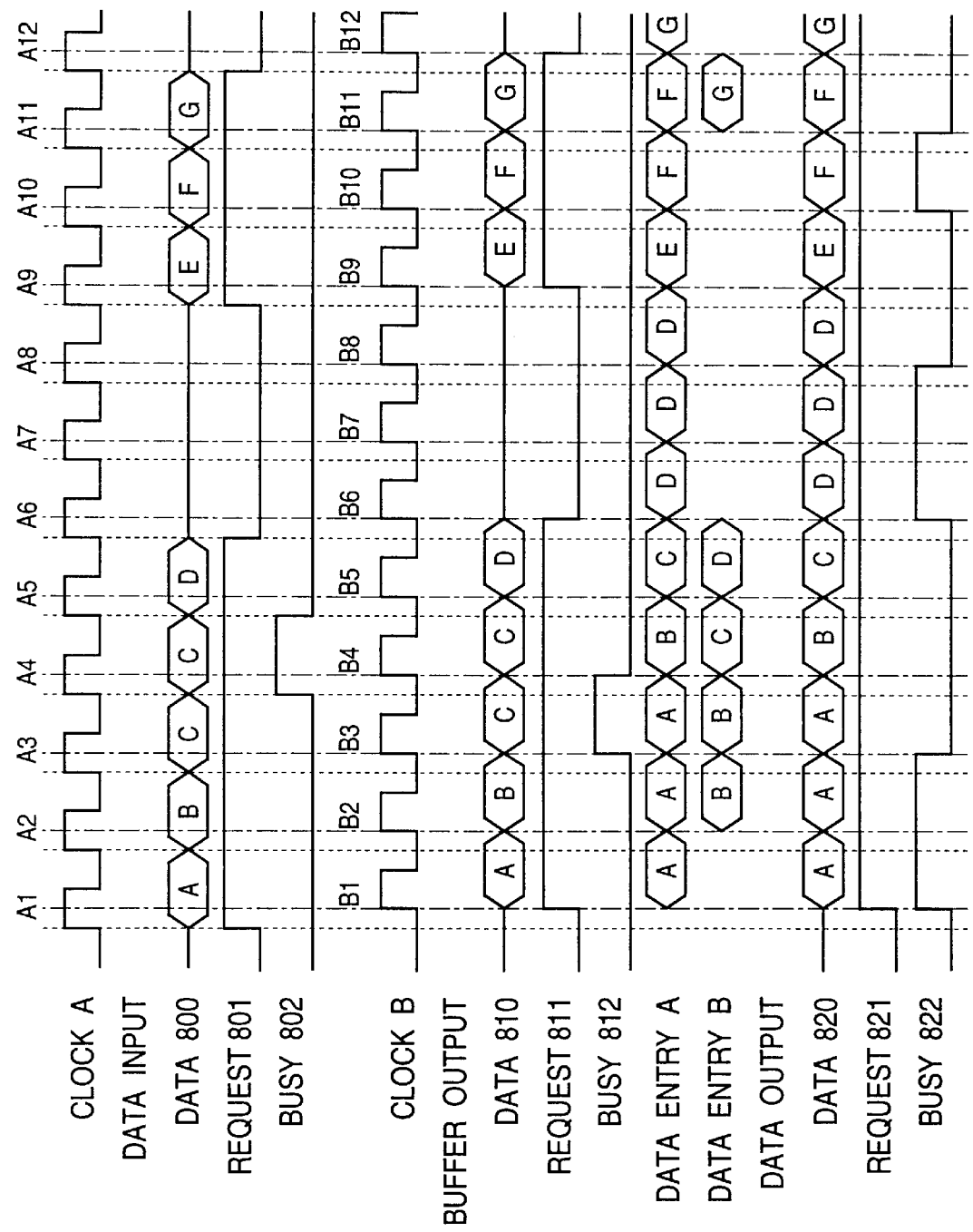
FIG. 4 is a timing chart illustrating the operation of the queue in the case that there is no difference in frequency between a clock signal A and a clock signal B, but there is a clock between the clock signal A and the clock signal B.

FIG. 4 is a timing chart illustrating the operation of the queue in the case that there is no difference in frequency between the clock signal A and the clock signal B, but there is a clock skew between the clock signal A and the clock signal B.

The data input 800 is supplied with data in the order of data A, data B and data C for a period from a clock A1 to a clock A3, in time with each clock. During a period in which the data is supplied, the request signal 801 is maintained at a high level. Thus, the data is held in the data buffer 80 in synchronism with the clock signal A, and the data held in the data buffer 80 is outputted as a data signal 810 in synchronism with the clock signal B. During a period in which the data buffer 80 holds an effective data, the data buffer 80 maintains the request signal 811 at a high level. In response to this request signal of the high level, the entry controller 82 controls the data FIFO 81 to fill up the data entries of the data FIFO 81 with the data.

In an initial condition, the two data entries, namely, a data entry A and a data entry B are empty. In response to a first clock B1 of the clock signal B, 8, the data A is held in the first data entry A, and in response to a second clock B2 of the clock signal B, 8, the data B is held in the second data entry B. During a period from the clock B1 to the clock B2, since the circuit block connected to the output of the queue outputs the busy signal 822 of a high level, the data entry are not released. Since there is only the two data entries, the data C is not held in the data entry in response to the clock B3. Therefore, the entry controller brings the busy signal 812 to a high level, which is supplied through the data buffer as the busy signal 802 to the circuit block at the input side of the queue.

In response to this busy signal 802, the circuit block at the input side of the queue outputs the same data C at a clock A4. A the clock B3, the busy signal 822 is brought to the low level, the data of the data entry A is outputted and then released. At the succeeding clock B4, the data C is held in the data entry B and the data B is shifted to the data entry A. The busy signals 812 and 802 are brought to the low level, so that a next data D is supplied in the data buffer, and in response to a next clock, the data is registered in the data entry B.

From a clock A6 to a clock A8, no new data is supplied, and the request signal 801 is at the low level. Therefore, no new data is registered in the data buffer. In addition, from a clock B6 to a clock B8, the request signal 811 is at a low level. However, since the busy signal 822 at the output side is at the high level during a period from the clock B6 to the clock B7, the data entry is not released, and the data D remains held in the data entry A.

Since the busy signal 822 is brought to the low level at the clock B8, the data D is outputted and the data entry A is released. From a clock A9 to a clock A11, data E, F and G are supplied in the named order, and the registered in the data entries through the data buffer, in a similar procedure. In the way, since the busy signal 822 at the output side is brought to the high level at a clock B10, two clocks are required for outputting the data F, and the data G is registered in the data entry B.

Figure 5:
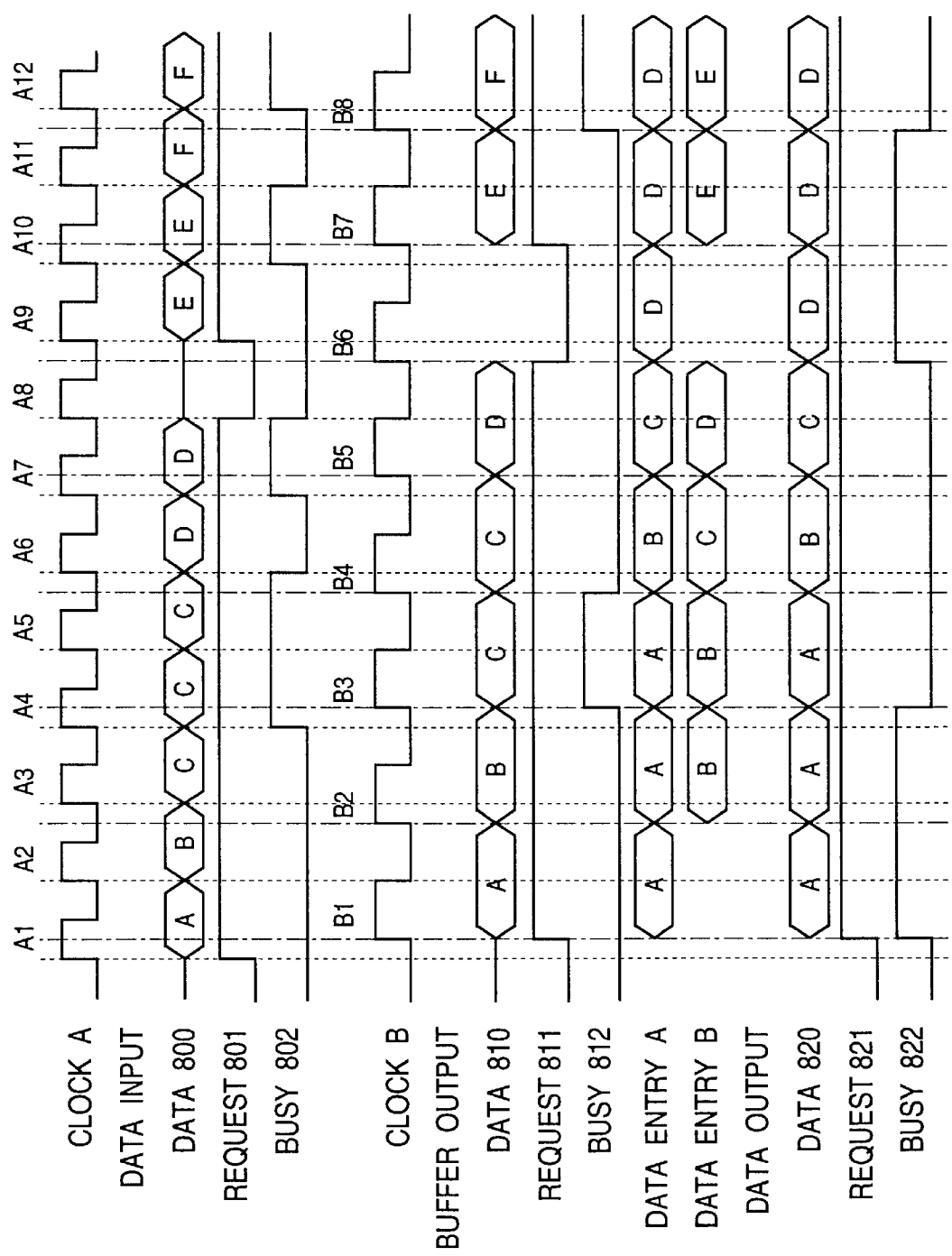
FIG. 5 is a timing chart illustrating the operation of the queue in the case that the frequency of the clock signal A is higher than that of the clock signal B.

FIG. 5 is a timing chart illustrating the operation of the queue in the case that there the frequency of the clock signal A is higher than that of the clock signal B.

From a clock A1 to a clock A3, data is supplied in the order of data A, data B and data C in time with each clock. At a clock B1, the data A is fetched in the data buffer, and the request signal 811 is brought to a high level, so that the data is registered in the data entry A. At a clock B2, the data B is fetched in the data buffer, and then, registered in the data entry B. Since the busy signal 822 is at a high level from the clock B1 to the clock B2, the data entries are not released. Since there is no rising of the clock B during the clock period of a next clock A3, the busy signal 802 is brought to the high level at a clock A4, so that the same data C is supplied to the data buffer.

At a clock B3, the data C is registered in the data buffer, but since there is no empty data entry, the busy signal 812 is brought the high level. Therefore, the busy signal 802 is maintained at the high level at the rising of a next clock A5, and therefore, the same data C is supplied to the data buffer at the clock A5. At the clock B3, the data A is released from the data entry, and at a next clock B4, the data C of the data buffer is registered in the data entry B, and the data B is shifted to the data entry A. Since there is no rising of the clock B during a clock period of a clock A6, no data is registered in the data buffer, and the busy signal 802 is brought to the high level at a clock A7, so that the data D is repeatedly supplied. At a clock B5, the data D is registered in the data buffer, and registered in the data entry B, and on the other hand, the data is shifted to the data entry A.

At a clock A8, no data is supplied, and therefore, the request signal 801 is brought to the low level. Therefore, at a clock B6, no data is fetched in the data buffer, and therefore, the request signal 811 is brought to the low level. At clocks B6 and B7, the busy signal 822 at the output side is at the high level, and therefore, the data D remains registered in the data entry A, without being released. Since there is no rising of the clock B during the period of a clock A9, no data is fetched in the data buffer, and the busy signal 802 is brought to the high level at a clock A10 so that the same data E is supplied to the data buffer. This data E is fetched in the data buffer at a clock B7, and then, registered in the data entry B. At a clock A11, data F is supplied, and at a clock B8, the data F is fetched in the data buffer. However, since there is no empty data entry, the busy signal 812 is brought to a high level, and, at a clock A12, the busy signal 802 at the input side is brought to the high level.

Figure 6:
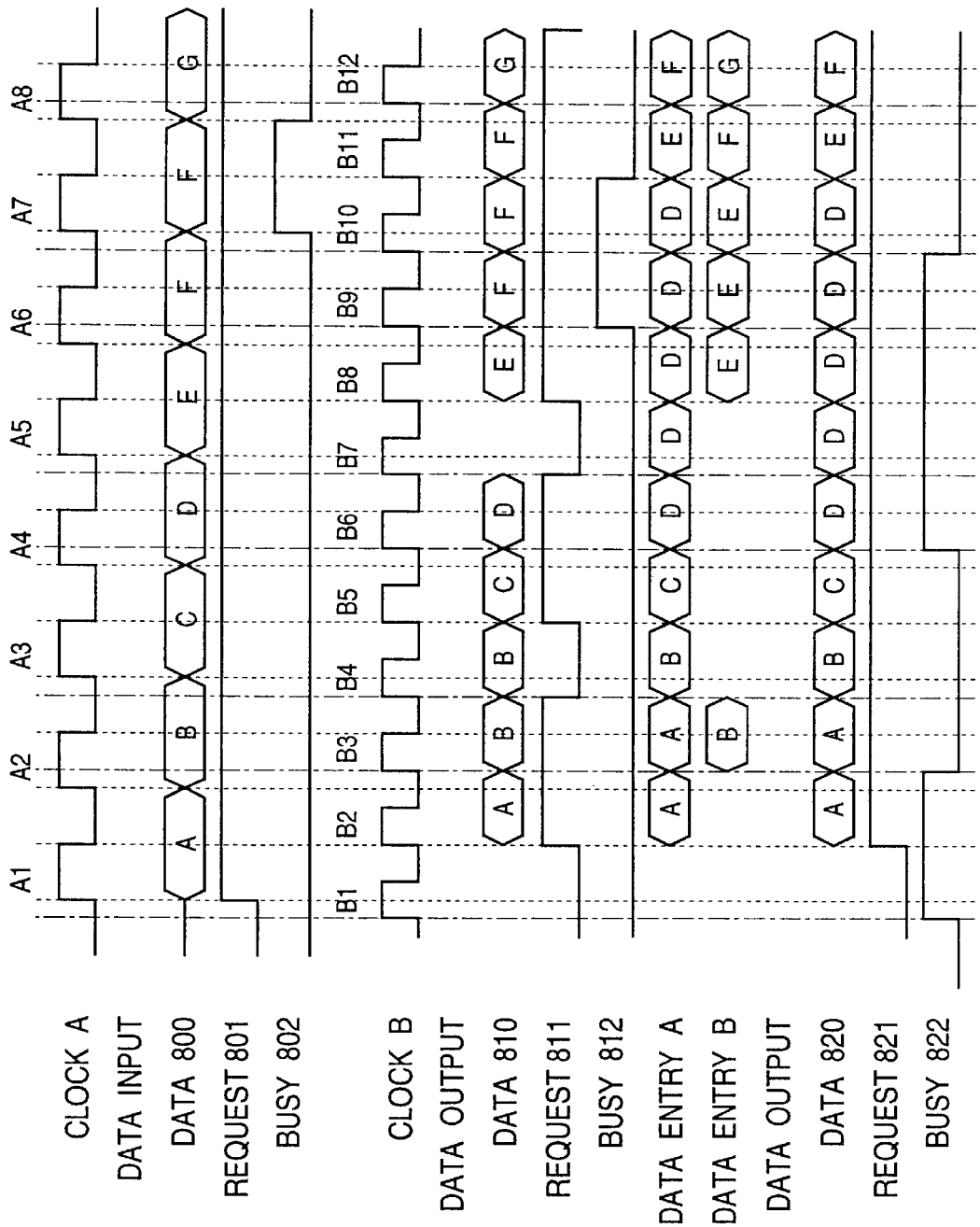
FIG. 6 is a timing chart illustrating the operation of the queue in the case that the frequency of the clock signal B is higher than that of the clock signal A.

FIG. 6 is a timing chart illustrating the operation of th queue in the case that there the frequency of the clock signal A is lower than that of the clock signal B. From a clock A1 to a clock A6, data A to data F are supplied in the name order, and the request signal 801 is maintained at a high level. At the rising of a clock B1, since the request signal 801 is at a low level, no data is fetched in the data buffer. At a clock B2, the data A is fetched in the data buffer, and then, registered in the data entry A. From the clock B1 to the clock B2, since the busy signal 822 at the output side is at a high level, the data A in the data entry A is not released. At a clock B3, the data B is fetched in the data buffer and then is registered in the data entry B. During the clock period of the clock B3, since there is no rising of the clock A, the same data is supplied at a clock B4. Therefore, no new data is fetched in the data buffer, and the request signal 811 is brought to the low. In the meanwhile, the data B in the data entry A is outputted and then released.

At a clock B5, the data C is fetched in the data buffer and registered in the data entry A, and immediately outputted and released. Succeedingly, at a clock B6, the data D is fetched in the data buffer and registered in the data entry A. Since the busy signal 822 at the output side is maintained at a high level from the clock B6 to a clock B9, the data is not released. During the clock period of the clock B6, since there is no rising of the clock A, no new data is fetched in the data buffer at the clock B7, and the request signal 811 is brought to the low level. At the clock B8, the data E is fetched in the data buffer and registered in the data entry B. At the clock B9, the data F is fetched in the data buffer, but since there is no empty data entry, the busy signal 812 is brought to the high level. At a clock B10, since no new data is supplied, the request signal 811 is brought to the low level, but since there is no empty data entry and the data F is staying, the busy condition is maintained. This busy condition is notified to the busy signal 802 at the input side, namely, the busy signal 802 is brought to the high level.

At a clock A7, since the busy signal 802 is outputted, the data F continues to be supplied. At the clock B10, the busy signal 822 at the output side is brought to the low level, the data D in the data entry A is released. At a clock B11, the data F is registered in the data entry B, and the data E is shifted to the data entry A, and further, is outputted and released. At a clock B12, data G is fetched in the data buffer and registered in the data entry B, and the data F is shifted to the data entry A, and further, is outputted and released.

In the case that the clock signals A and B are different in frequency, in order to ensure that before the data is completely fetched in the data buffer at the clock signal A, the data is never outputted at the clock signal B, the data buffer brings the request signal 811 to the low level when the data is fetched between a set-up time for the rising of the clock signal B and a hold time of the clock signal B. On the other hand, in the case that the clock signals A and B are equal in frequency, in order to prevent he data from being fetched between the set-up time and the hold time of the clock signal B, the clock is supplied in such a manner that the timing of the clock signal A is deviated from the timing of the clock signal B. This is easier than to design to minimize the clock skew.

Next, second to sixth embodiments of the semiconductor integrated circuit in accordance with the present invention will be described with reference to FIGS. 7 to 11.

Figure 7:
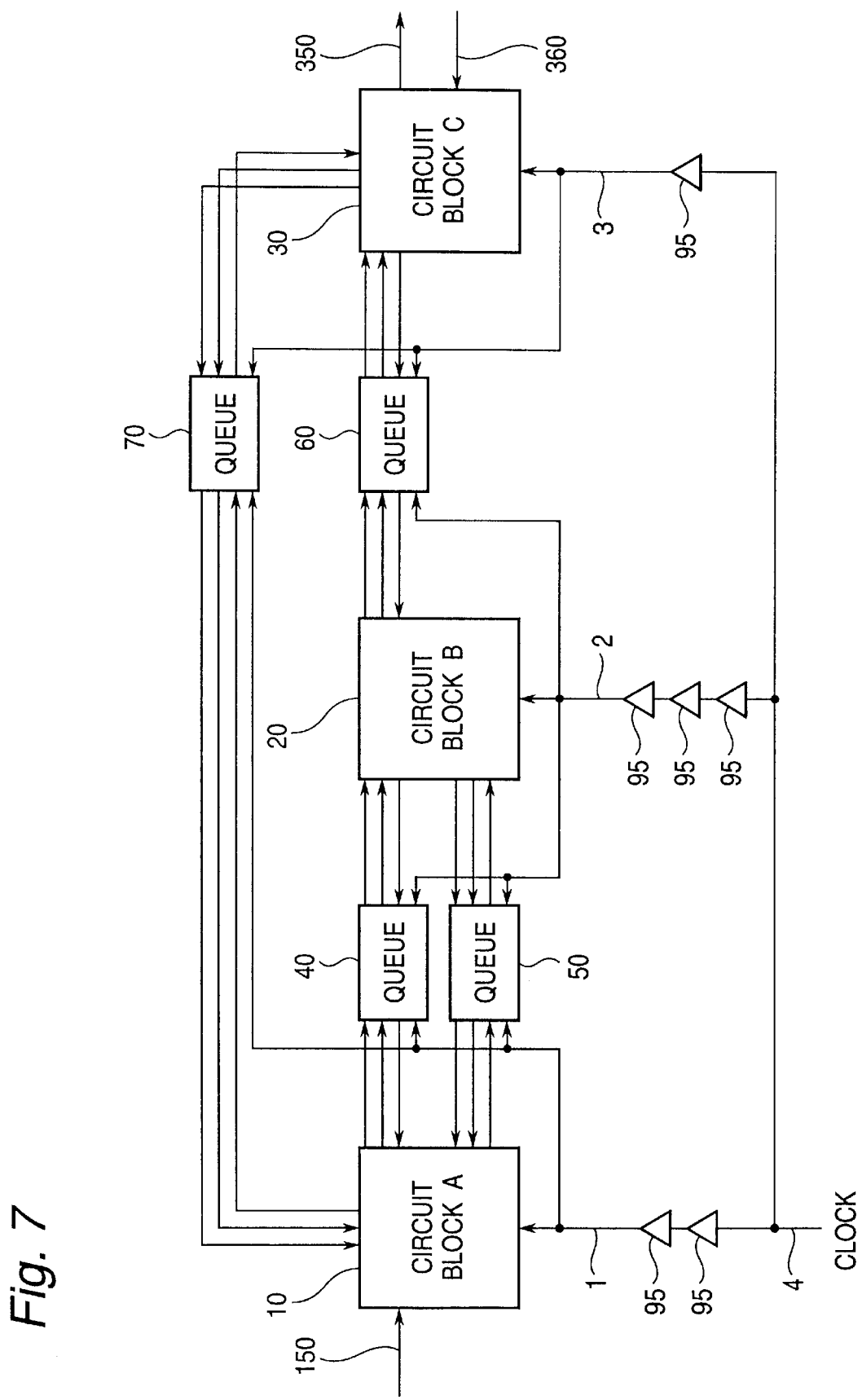
FIG. 7 is a block diagram of a second embodiment of the semiconductor integrated circuit in accordance with the present invention, in which clock signals having the same frequency are supplied from one clock signal to respective circuit blocks.

FIG. 7 is a block diagram of the second embodiment of the semiconductor integrated circuit in accordance with the present invention, in which clock signals having the same frequency are supplied from one clock signal to respective circuit blocks. In FIG. 7, elements similar to those shown in FIG. 1 are given the same Reference Numerals, and explanation thereof will be omitted for simplification of the description.

All the clock signals 1, 2 and 3 to be supplied to the circuit blocks 10, 20 and 30, respectively, are derived from one common clock 4, and are supplied to the respective circuit blocks 10, 20 and 30, after the clock is amplified by clock buffers 95 in order to intensify a driving power of the clock. In each of the circuit blocks, the clock signal is distributed with generating no clock skew. Actually, the circuit blocks are different in the number of flipflops included in the circuit block, and also are different in an input load for the clock signal. Therefore, by changing the number of cascaded clock buffers dependently upon these different factors, the driving power of the clock is intensified to meet with the load. As a result, since the number of clock buffers is different from one circuit block to another, there occurs a clock skew between the circuit blocks, but since the data is transferred through the queue between the circuit blocks, there is no influence of the clock skew.

Figure 8:
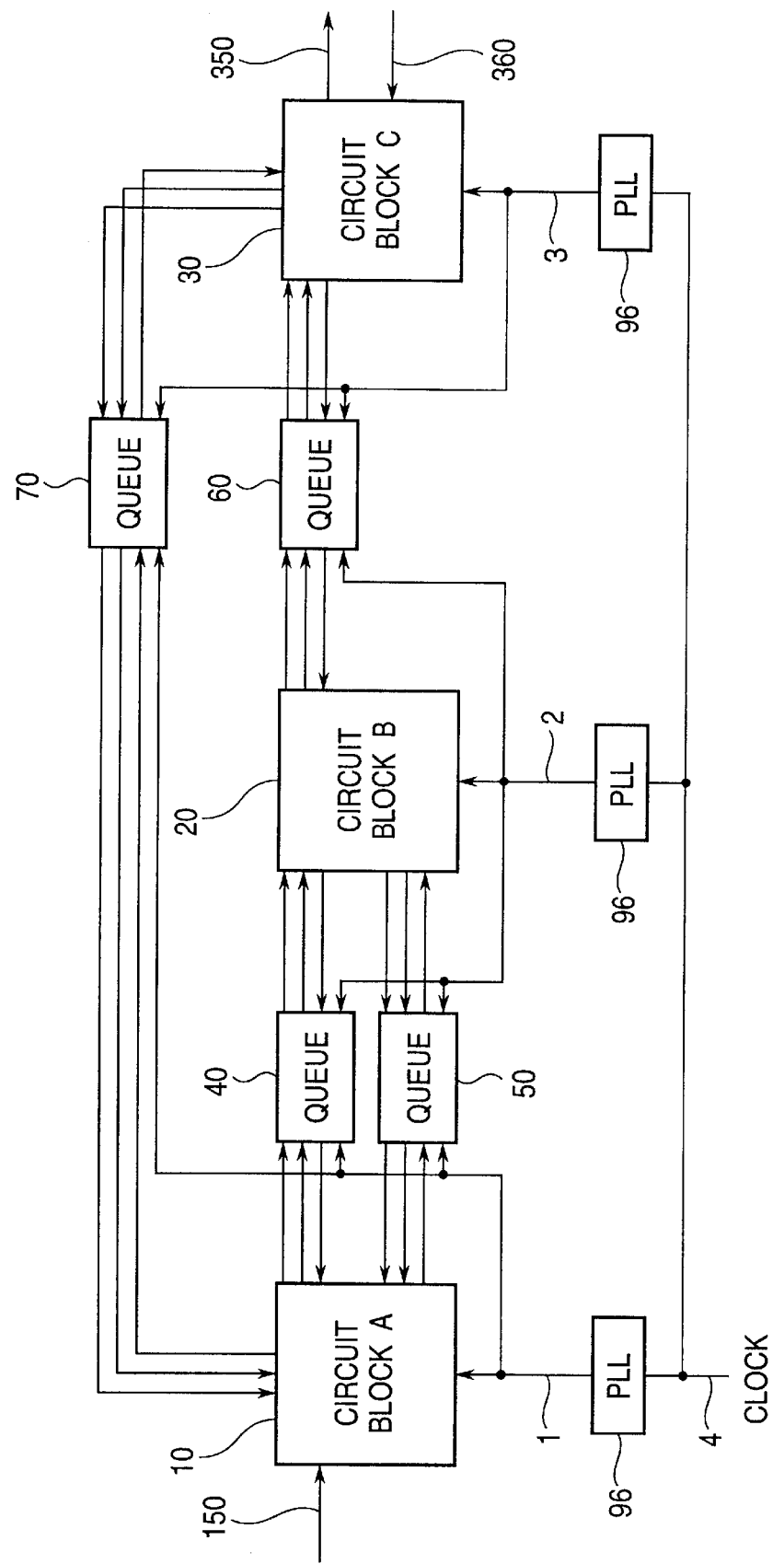
FIG. 8 is a block diagram of a third embodiment of the semiconductor integrated circuit in accordance with the present invention, in which each of the circuit blocks is associated with a PLL circuit which uses one common clock as a reference signal but generates a clock signal necessary for the associating circuit block.

FIG. 8 is a block diagram of a third embodiment of the semiconductor integrated circuit in accordance with the present invention, in which each of the circuit blocks is associated with a PLL circuit 96 which uses the one common clock 4 as a reference signal but generates a clock signal 1, 2 or 3 necessary for the associating circuit block. In FIG. 8, elements similar to those shown in FIG. 1 are given the same Reference Numerals, and explanation thereof will be omitted for simplification of the description.

In this embodiment, the clock signal is distributed to minimize the clock skew in each circuit block. In this embodiment, each PLL circuit 96 can generate the clock signal having the same frequency as that of the common clock signal 4, or alternatively, can generate the clock signal having the same frequency as that obtained by multiplying or dividing the frequency of the common clock signal 4. Even if the frequencies of the respective PLL circuits 96 are equalized to each other, since there is a phase difference or a jitter between the outputs of the PLL circuits 96, the rising timing of the clock signals supplied to the respective circuit blocks are different. However, since the data is transferred through the queue between the circuit blocks, the data can be transferred with no problem. Therefore, the circuit blocks can operate with a clock frequency different from each other, by setting the multiplication factor of the respective PLL circuits different from each other.

Figure 9:
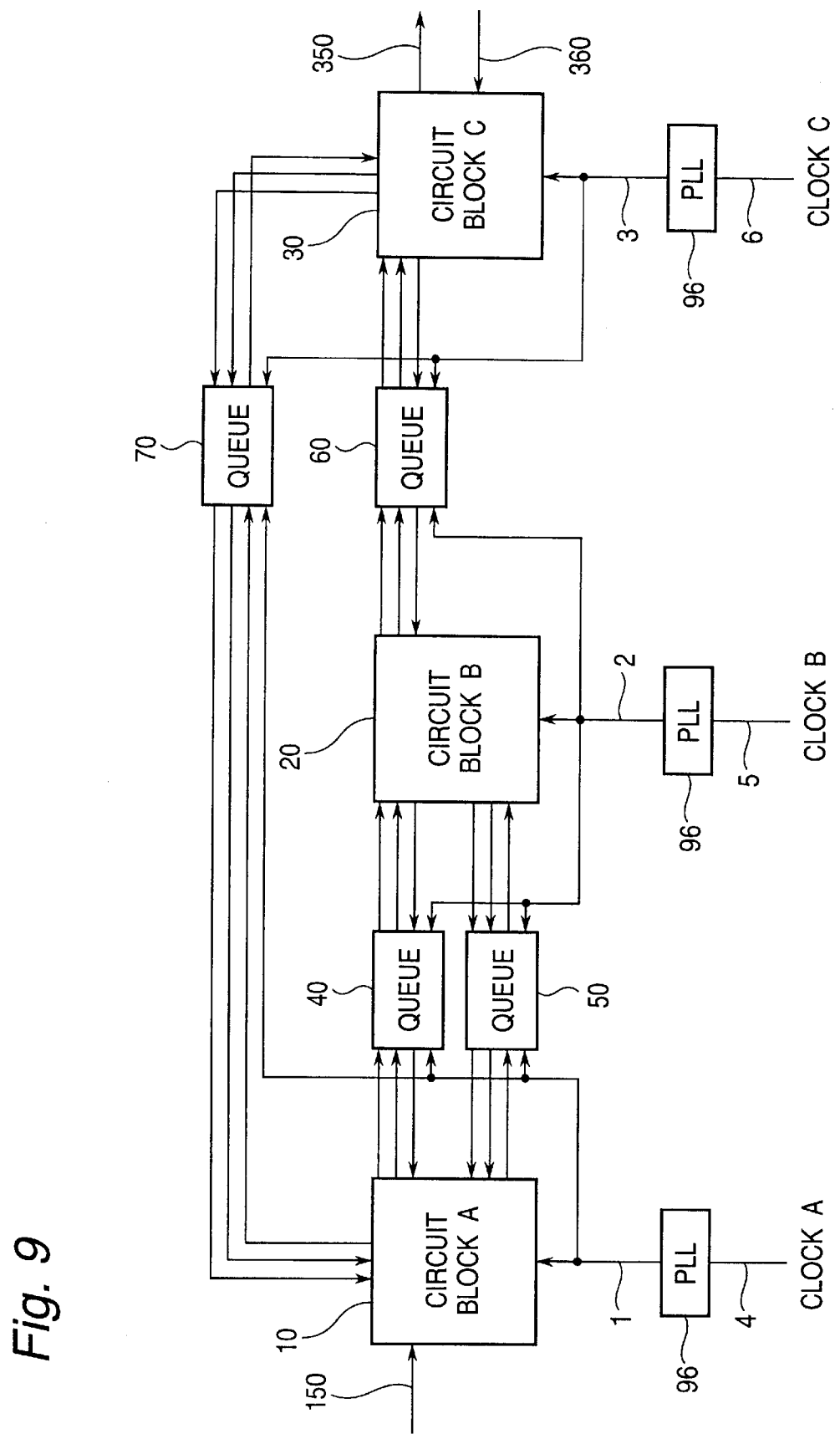
FIG. 9 is a block diagram of a fourth embodiment of the semiconductor integrated circuit in accordance with the present invention, in which each of the circuit blocks is associated with a PLL circuit which uses a different clock as a reference signal but generates a clock signal necessary for the associating circuit block.

FIG. 9 is a block diagram of a fourth embodiment of the semiconductor integrated circuit in accordance with the present invention, in which each of the circuit blocks is associated with a PLL circuit which uses a different clock 4, 5 or 6 as a reference signal but generates a clock signal necessary for the associating circuit block. In FIG. 9, elements similar to those shown in FIG. 8 are given the same Reference Numerals, and explanation thereof will be omitted for simplification of the description.

With this arrangement, it is possible to arbitrarily set the clock frequency of each circuit block, independently of the other circuit blocks. Each PLL circuit 96 can generate the clock signal having the same frequency as that of the reference signal, or alternatively, can generate the clock signal having the same frequency as that obtained by multiplying the frequency of the reference signal. Of the circuit blocks, the throughput can be elevated in the circuit block which is large in data processing amount, by supplying the clock having a high frequency, and the throughput can be lowered in the circuit block which is small in data processing amount, by supplying the clock having a low frequency.

Figure 10:
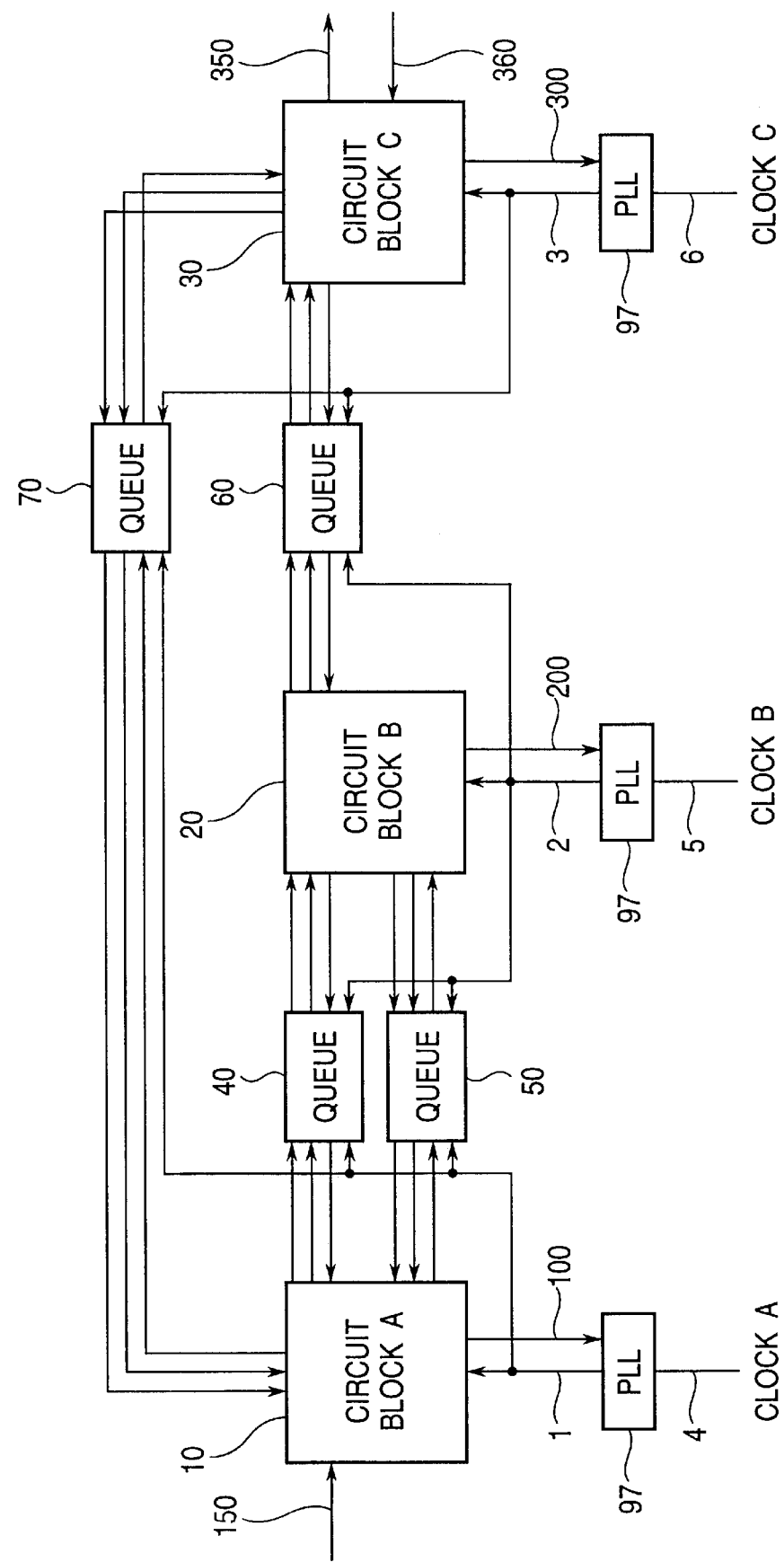
FIG. 10 is a block diagram of a fifth embodiment of the semiconductor integrated circuit in accordance with the present invention, in which each of the circuit blocks is associated with a PLL circuit which uses a different clock as a reference signal but generates a clock signal necessary for the associating circuit block, and which receives a control signal fed back from the associating circuit block.

FIG. 10 is a block diagram of a fifth embodiment of the semiconductor integrated circuit in accordance with the present invention, in which each of the circuit blocks is associated with a PLL circuit which uses a different clock 4, 5 or 6 as a reference signal by generates a clock signal necessary for the associating circuit block, and which receives a control signal 100, 200 or 300 fed back from the associating circuit block. In FIG. 10, elements similar to those shown in FIG. 9 are given the same Reference Numerals, and explanation thereof will be omitted for simplification of the description.

The control signals 100, 200 and 300 indicate whether the current data processing amount of the associated circuit block is large or small. If the data processing amount becomes large, the PLL circuit is controlled to increase the frequency of the generated clock signal 1, 2 or 3, in order to elevate the throughput. To the contrary, if the data processing amount becomes small, the PLL circuit is controlled to decrease the frequency of the generated clock signal 1, 2 or 3, in order to lower the throughput, thereby to reduce the power consumption of the associated circuit block. In this embodiment, the frequency of the PLL circuit can be controlled by changing the multiplication factor, or by giving an offset voltage to an input voltage signal supplied to a voltage controlled oscillator included in the PLL circuit.

Figure 11:
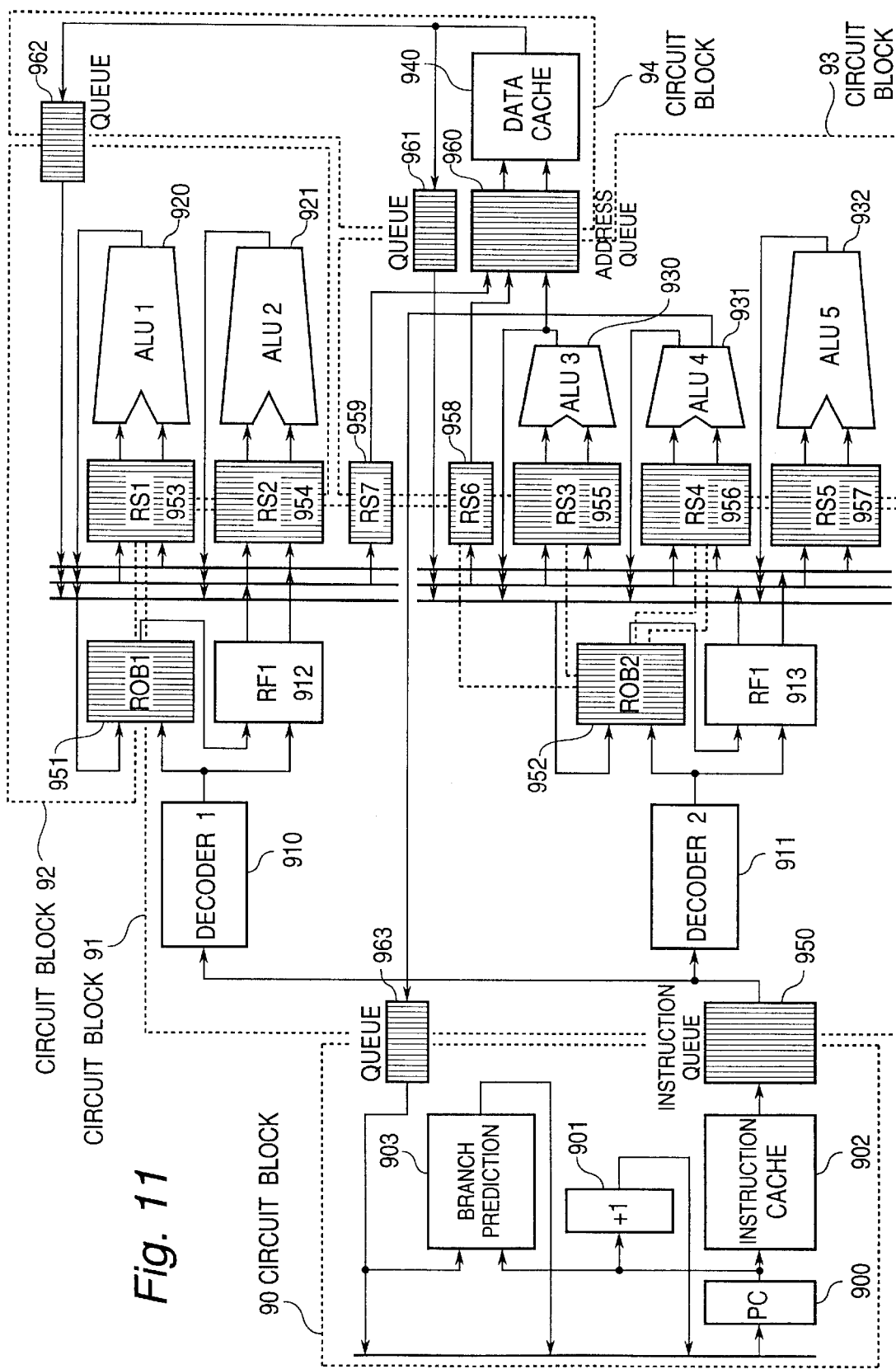
FIG. 11 is a block diagram of a sixth embodiment of the semiconductor integrated circuit in accordance with the present invention, applied to a superscalar processor.
Figure 12:
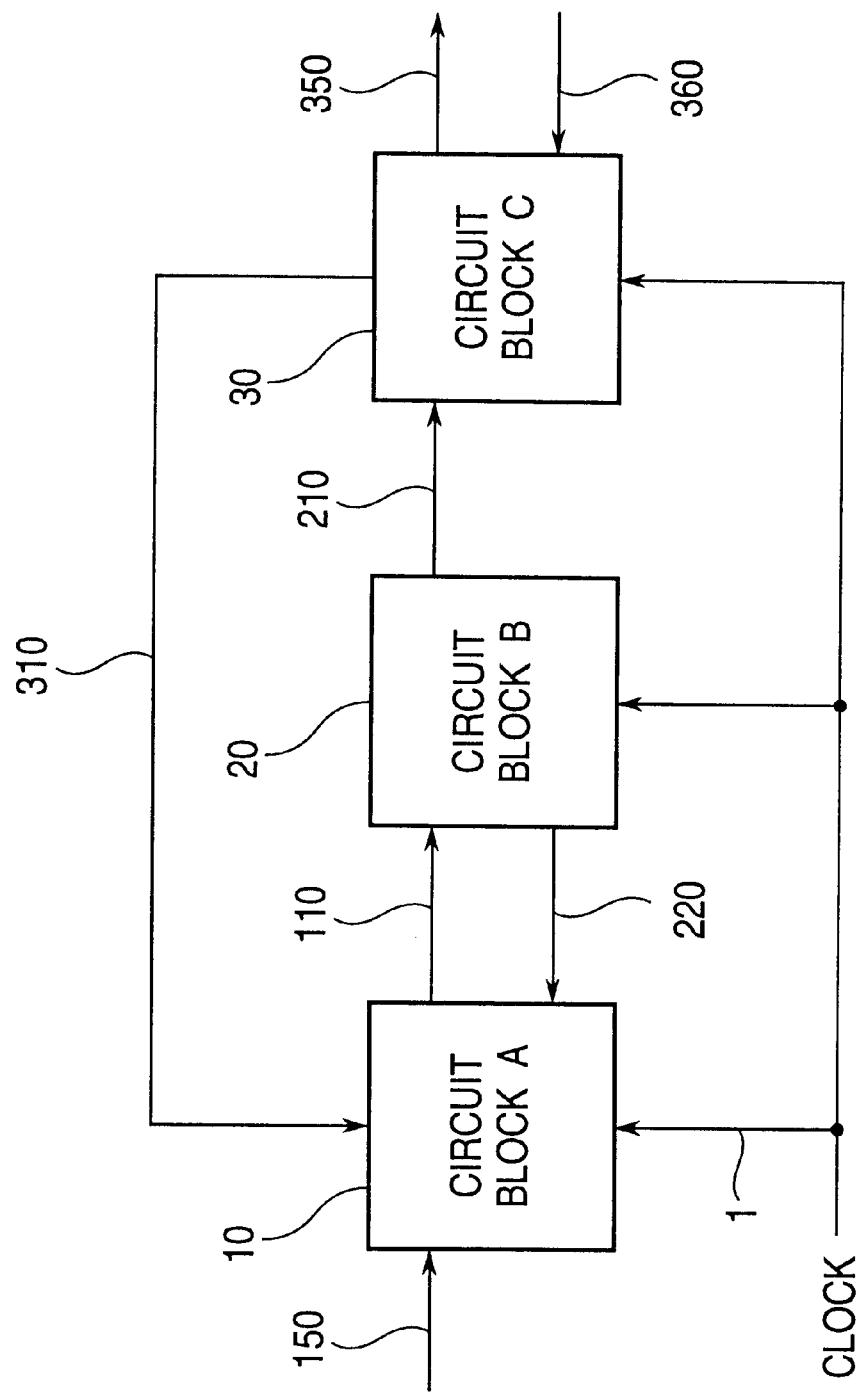
FIG. 12 is a block diagram of the prior semiconductor integrated circuit.

FIG. 11 is a block diagram of a sixth embodiment of the semiconductor integrated circuit in accordance with the present invention, applied to a superscalar processor.

In the superscalar processor, in order to queue the data, there are provided a number of circuits having a FIFO construction, such as an instruction buffer, a reservation station, a reorder buffer, and an address buffer. Therefore, by constructing these FIFO construction circuits in the form of the queue as shown in FIG. 2 or 3, the clock for the circuit before the queue and the clock for the circuit after the queue are made different from each other. In the queue shown in FIG. 2, the same data entries are constituted in the form of the FIFO, the data is outputted in the order in which the data was inputted. However, if the queue is constructed as shown in FIG. 3, it is possible to change the order of the data outputting, and therefore, it is possible to change the order of the instruction processing.

The embodiment shown in FIG. 11 is a superscalar processor having two arithmetic and logic processing lines. A first circuit block 90 includes a program counter 900, an incrementer 901, an instruction cache 902, and a branch prediction unit 903. A second circuit block 91 includes a first instruction decoder 910, a second instruction decoder 911, a first register file 912 and a second register file 913. A third circuit block 92 includes a first ALU (arithmetic and logic unit) 920 and a second ALU 921, and a fourth circuit block 93 includes a third ALU 930, a fourth ALU 931 and a fifth ALU 932. A fifth circuit block 94 includes a data cache 940.

An instruction queue 950 is connected between the first and second circuit blocks 90 and 91, and information such as a branch condition is fed back through a first queue 963 from the ALU 931. Between the second and third circuit blocks and between the second and fourth circuit blocks, data is transferred through reservation stations 953 to 959 and reorder buffers 951 and 952. Between the third and fifth circuit blocks, an address and data are transferred through an address queue 960 to the data cache 940, and a read-out data is received through a second queue 961. Between the fourth and fifth circuit blocks, data is received through a third queue 962.

The first to fifth circuit blocks can be supplied with different clock signals, respectively. The different clock signals can be clocks having the same frequency but in which a skew exists between the clocks. Alternatively, the different clock signals can be clocks having different frequencies fitted to the data processing amount of the respective circuit block.

As a variation, the first circuit block can be divided into two sub-circuit blocks by providing a second address queue before the instruction cache. The second circuit block can be divided into a first sub-circuit block including the first instruction decoder 910 and the first register file 912 and a second sub-circuit block including the second instruction decoder 911 and the second register file 913. Furthermore, each of the third and fourth circuit blocks can be divided into sub-circuit blocks in units of one ALU.

Although not shown in FIG. 11, a control block for a data transfer with an external device constitutes one circuit block, which writes an instruction code into the instruction cache of the first circuit block through a queue (also not shown) and transfers data with the data cache of the fifth circuit block through a queue (also not shown). In order to transfer data between each of the first register file and the second register file and the data cache, the reservation station 959 is provided to connect from the first register file of the second circuit block to the fourth circuit block, and the output of this reservation station 959 and the output of the reservation station 958 are selectively supplied to the address queue 960.

As mentioned above, the present invention is characterized by dividing the whole of the semiconductor integrated circuit into a plurality of circuit blocks, by locating a queue between the circuit blocks, and limiting the construction of the queue in accordance with necessity. With this feature, it is possible to operate the semiconductor integrated circuit with a clock signal having a high frequency, and in addition, it is also possible to reduce the power consumption in the semiconductor integrated circuit operating with a high frequency.

The invention has thus been shown and described with reference to the specific embodiments. However, it should be noted that the present invention is in no way limiting to the details of the illustrated structures but changes and modifications may be made within the scope of the appended claims.

What is claimed is:

1. A semiconductor integrated circuit operating in synchronism with a clock signal, comprising a plurality of circuit blocks divided into units of a function, wherein different clock signals are supplied via clock buffers to the circuit blocks having a size respectively; each of the circuit blocks being scaled to (a) the size of said clock buffers, and (b) the balance in load distributed on said clock buffers, and a data signal between at least two circuit blocks of the plurality of the circuit blocks being transferred through a queue which is controlled by the clock signal supplied to the two circuit blocks; wherein said queue includes a data buffer fetching data in response to a first clock signal and outputting the data in response to a second clock signal, and a plurality of buffers operating to hold an output of the data buffer in response to the second clock signal.

2. A semiconductor integrated circuit claimed in claim 1 wherein the clock signals supplied to the respective circuit blocks are generated in one common clock signal source, and supplied to each circuit block through respective independent paths.

3. A semiconductor integrated circuit claimed in claim 1 wherein the clock signals supplied to the respective circuit blocks are generated in different phase locked loop circuits, respectively.

4. A semiconductor integrated circuit claimed in claim 1 wherein the clock signals supplied to the respective circuit blocks are different from one another in frequency.

5. A semiconductor integrated circuit claimed in claim 4 wherein the clock signals having the different frequencies, supplied to the respective circuit blocks, are generated in different phase locked loop circuits, respectively.

6. A semiconductor integrated circuit claimed in claim 1 wherein said queue is a superscalar processor comprising an instruction queue, a reservation station, a reorder buffer, and/or an address queue.

7. A semiconductor integrated circuit claimed in claim 6 wherein the clock frequency is different before and after the queue.

8. A semiconductor integrated circuit claimed in claim 7 wherein the clock frequency is modified in accordance with the amount of data processing in different constituents of the superscalar processor.

9. A semiconductor integrated circuit claimed in claim 7 wherein the clock frequency is modified in accordance with the amount of data processing in an arithmetic and logic unit and a cache memory of the superscalar processor.

10. A semiconductor integrated circuit claimed in claim 1 wherein said queue includes a data buffer fetching data in response to a first clock signal and outputting the data in response to a second clock signal, and a first-in first-out buffer operating to hold an output of the data buffer in response to the second clock signal.

11. A semiconductor integrated circuit claimed in claim 10 wherein said queue is a superscalar processor comprising an instruction queue, a reservation station, a reorder buffer, and/or an address queue.

12. A semiconductor integrated circuit claimed in claim 11 wherein the clock frequency is different before and after the queue.

13. A semiconductor integrated circuit claimed in claim 12 wherein the clock frequency is modified in accordance with the amount of data processing in different constituents of the superscalar processor.

14. A semiconductor integrated circuit claimed in claim 12 wherein the clock frequency is modified in accordance with the amount of data processing in an arithmetic and logic unit and a cache memory of the superscalar processor.

15. A semiconductor integrated circuit operating in synchronism with a clock signal, comprising a plurality of circuit blocks divided into units of a function, wherein different clock signals are supplied via clock buffers to the circuit blocks, respectively; each of the circuit blocks having a size being scaled to (a) the size of said clock buffers, and (b) the balance in load distributed on said clock buffers, and a data signal between at least two circuit blocks of the plurality of the blocks being transferred through a queue which is controlled by the clock signal supplied to the two circuit blocks, wherein the clock signals supplied to the respective circuit blocks are different from one another in frequency, said clock signals being supplied to the respective circuit blocks are generated in different phase locked loop circuits, respectively, and wherein the frequency of the clock signal generated in each phase locked loop circuit is controlled on the basis of the data processing amount in the circuit block operating with the clock signal supplied from the same phase locked loop circuit.

* * * * *

UNITED STATES PATENT AND TRADEMARK OFFICE
CERTIFICATE OF CORRECTION

PATENT NO. : 6,240,524 B1
DATED : May 29, 2001
INVENTOR(S) : Kazumasa Suzuki

It is certified that error appears in the above-identified patent and that said Letters Patent is hereby corrected as shown below:

<u>Title page, Item [54] and Column 1, line 1,</u>
In the title "SEMICONDUCTOR INTEGRATED CIRCUIT" should be
-- INTEGRATED CIRCUIT OPERATING IN SYNCHRONISM WITH A CLOCK SIGNAL --

Signed and Sealed this

Thirteenth Day of August, 2002

*Attest:*

*Attesting Officer*

JAMES E. ROGAN
*Director of the United States Patent and Trademark Office*